Nov. 26, 1968 M. J. STEVKO 3,413,423

SPECIAL PURPOSE TELEPHONE SUBSET

Filed June 30, 1965 3 Sheets-Sheet 1

INVENTOR
MARTIN J. STEVKO
BY [signature]
ATTY.

INVENTOR
MARTIN J. STEVKO
BY C. A. Gulbrandsen
ATTY.

INVENTOR
MARTIN J. STEVKO
BY C. A. Gulbrandsen
ATTY.

United States Patent Office 3,413,423

Patented Nov. 26, 1968

3,413,423

SPECIAL PURPOSE TELEPHONE SUBSET

Martin J. Stevko, Addison, Ill., assignor to Automatic Electric Laboratories, Inc., Northlake, Ill., a corporation of Delaware Filed June 30, 1965, Ser. No. 468,243
3 Claims. (Cl. 179—100)

ABSTRACT OF THE DISCLOSURE

A desk type telephone subset for use in the transmission of both voice and data. Switching from the voice to data mode is accomplished by placing the telephone handset on a second hook-switch that operates in response to a permanent magnet located within the handset.

This invention relates to telephone equipment, and more particularly to the new and novel construction of a special purpose telephone substation instrument.

The utilization of telephone equipment for the transmission of data from one location to another has become more and more prevalent. Until recently if a communication path were used for both voice and data transmission, a standard telephone substation instrument was utilized for voice transmission and an additional facility was utilized for switching of the equipment from the voice to the data mode. This special equipment usually took the form of a small additional "black box" that provided mounting space for the necessary switching equipment and perhaps a pilot lamp associated with the data mode of operation.

It is the particular object of this present invention therefore to provide a telephone subset which may be utilized for communication in both voice and data modes.

A further object is the provision of a telephone subset which includes switching means for readily transferring the mode of operation of a telephone subset from one mode to another in a simple and easy manner.

A feature of this invention is the provision of a telephone subset having a housing made up of two shells fastened to a center divider plate.

A further feature of this invention is the provision of a telephone subset having a first hookswitch of the general type disclosed and claimed in U.S. Patent 2,990,456 issued to W. C. Nise, except that the hookswitch actuating bars are pivoted in front of the handset wells and the top edge of the actuating bars are slanted from the horizontal such that the rear edge is higher than the front edge.

A further feature of this invention is the provision of a second hookswitch that includes magnetic actuable switching contacts.

A further feature of this invention is the provision of a telephone handset including a permanent magnet for actuating a second hookswitch.

A typical circuit for the special purpose telephone subset shown herein has been disclosed in copending U.S. Patent application Ser. No. 275,373, filed Apr. 24, 1963 by R. T. Cleary and R. V. Burns, which issued on November 29, 1966 as U.S. Patent 3,288,932.

The invention will be more fully understood from the following detailed description of an embodiment thereof as shown in the accompanying drawings, wherein.

Figure 1:
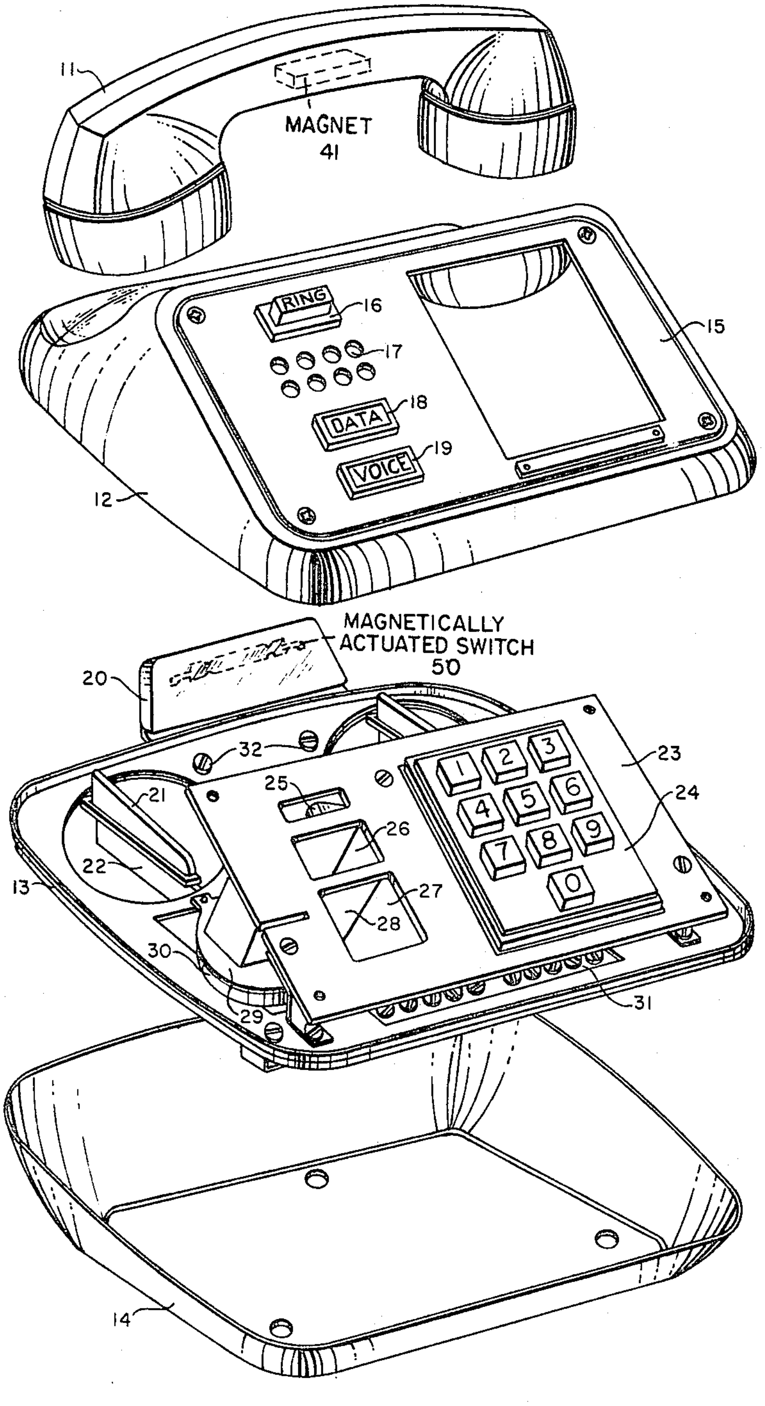
FIG. 1 is an exploded perspective view of the subset showing the handset, the upper shell and face plate, the center plate mounting various components and showing the mode transfer hookswitch and the lower shell.
Figure 3:
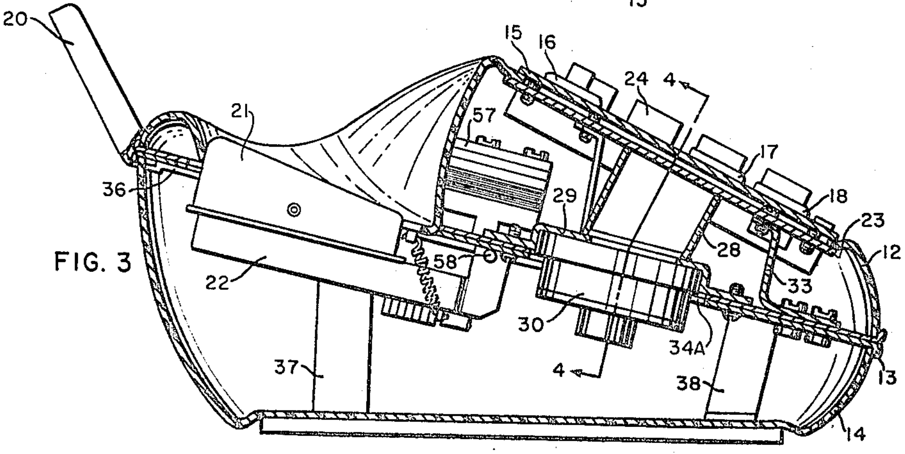
FIG. 3 is a cross-section taken along lines 3—3 of FIG. 5 less the handset.
Figure 4:
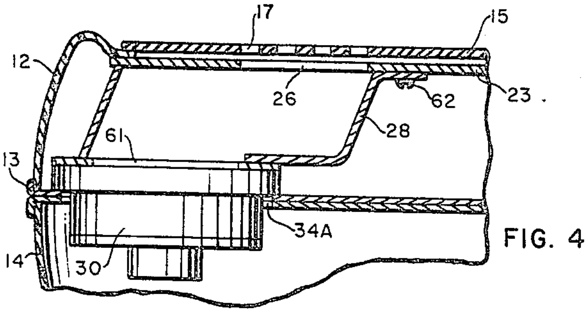
FIG. 4 is a partial cross-section taken along the lines 4—4 of FIG. 3, showing the acoustic coupler, the signalling transducer and the associated structure which conduct sound from the internally mounted transducer to the exterior of the handset.

Referring now to the drawings it may be noted in FIGS. 1 and 3 that the upper shell 12, center plate 13 and lower shell 14 of the subset are shown in nonassembled and assembled condition respectively. The center plate 13 is composed of two identical flange plates positioned back to back. The flanged portions serve as retaining walls for the lower edge of shell 12 as well as for the upper edge of shell 14.

Figure 5:
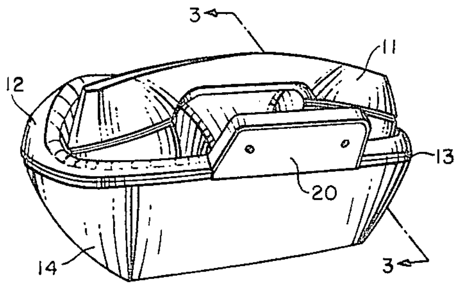
FIG. 5 is a perspective view showing the rear of the subset, with the handset in place in the recesses formed in the subset to accommodate it. This is the normal "on-hook" location for the handset.

Shells 12 and 14 are made of molded plastic in the instant disclosure. However, this is not to say that they might not be constructed of other material. The upper shell 12 has a flattened front portion with a forward downward slant upon which is mounted plate 15. When upper shell 12 is in place upon center plate 13 upper plate 15 is fastened to plate 23. Plate 15 thus serves as an escutcheon for the push button calling device 24 mounted on plate 23 and also mounting means for the "Ring" push button 16 and mode light 18 and 19. Upper plate 15 also includes a plurality of apertures such as 17 through which the sound from the tone signaling transducer 30 may emit. The lower shell 14 is generally dish shaped and has a generally flat bottom portion serving as a base for the subset. The rear edge of shell 14 is slightly higher than the front edge and thus with the subset assembled the plate 15 is tipped forward slightly to further enhance the assessibility of the components therein by the user. As may be seen by reference to FIG. 5 the rear portion of upper shell 12 includes two recessed areas or wells for accommodating the transmitter and receiver capsules of the handset 11.

Brackets 37 and 38 as shown in FIG. 3 extend from the lower surface of plate 13 and serve as mounting brackets to which the lower shell is fastened. The upper shell portion 12 is firmly held in place against plate 13 by virtue of its being firmly secured between the mounting plate 23 and upper plate 15. This may be seen by referring to the sectional view of FIG. 3.

Figure 2:
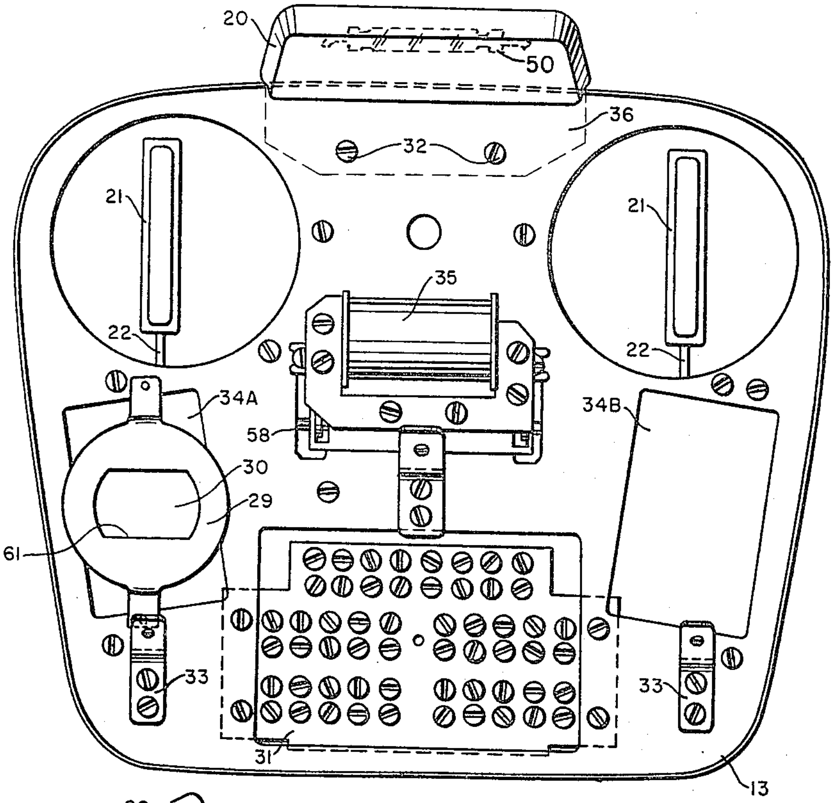
FIG. 2 is a top view of the center plate showing the mounting of various components.

The components of the subset which may be generally as described in the aforementioned patent application by R. V. Burns and R. T. Cleary are mounted on both sides of center plate 13 as shown in FIGS. 2 and 3. For example the signaling transducer 30 is held in place in the aperture 34A of plate 13 and the sound from the transducer is coupled from transducer through the opening 17 on the face plate by means of acoustic coupler 28 which conducts the sound from the face of transducer 30 through the aperture 26 shown in FIG. 1 and then through to the opening such as 17 in the upper plate 15. The induction coil 35 is held to the upper surface of the plate by brackets.

The mode transferring hookswitch 20 is mounted on the rear of the center plate 13 by means of bracket 36 held in place by fasteners 32. The location of this auxiliary hookswitch is such as to form a ready means of support for the handset when the subset is placed in the data mode of operation. This is best seen by reference to FIG. 5. The hookswitch bars 21 as viewed in FIGS. 2 and 3 protrude slightly above the floor of the recessed portions of the upper shell.

Arms 22 to which bars 21 are attached to pivot about pin 58 which is in front of the recessed portions of the upper shell. Located on the upper plate 15 are the ringing key 16, apertures such as 17, through which sound from the tone signaling transducer 30 may emit, and mode indicating lamps such as data lamp 18 and voice lamp 19. As may be noted by reference to FIG. 1 when the subset is assembled the ring key 16 will engage the switch mechanism 25 and aperture 26 will lie underneath the sound emitting openings such as 17. The lower portions of the data and voice lamps 18 and 19 respectively will pass through aperture 27 for connection to the subset circuitry.

It may be noted by reference to FIGS. 1, 2 and 3 the tone signaling transducer 30 is placed within aperture 34A and held in place by a bracket 30 which is fastened to the center plate 13. The structure 28 acts as an acoustic coupler for coupling sound from the top of the transducer 30 to the lower portion of plate 23 where its opening or mouth is placed below aperture 26. It is from this source than ringing signals progress through the opening 17 for signaling of the subscriber.

Referring to FIGS. 2 and 3 the mode transfer hookswitch 20 is fastened to the center plate 13 at the rear center portion of the subset. Physical connection is made by means of bracket 36 which is held in place to the center plate 13 by fasteners 32. The bracket 36 forms the rear portion of the mode transfer hookswitch 20, as can be readily seen by reference to FIG. 7. The front portion of the mode transfer hookswitch housing 56 is preferably made of the same material as the upper and lower housing shells 12 and 14. This covering is held in place to the rear bracket 36 by means of fasteners such as 45 which may engage a portion of the front cover specifically molded to receive an attaching device such as screw 55.

Contained within the mode transfer hookswitch 20 is a switching means, such as a reed capsule 50 which comprises a glass cylinder including a pair of contacts such as 51 and 52 located therein. The switching means as shown herein is held in place by a pad 53 preferably made of some resilient material such as rubber.

Figure 6:
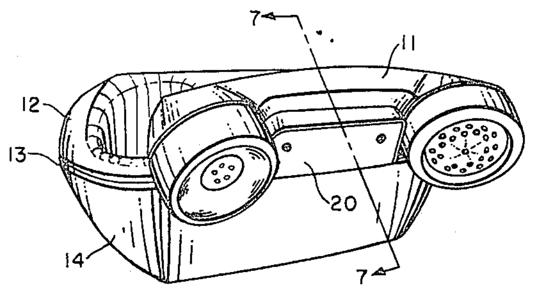
FIG. 6 is a perspective view showing the rear of the subset with the handset in place on the mode transferring hookswitch, indicating the location of the handset during data transmission.
Figure 7:
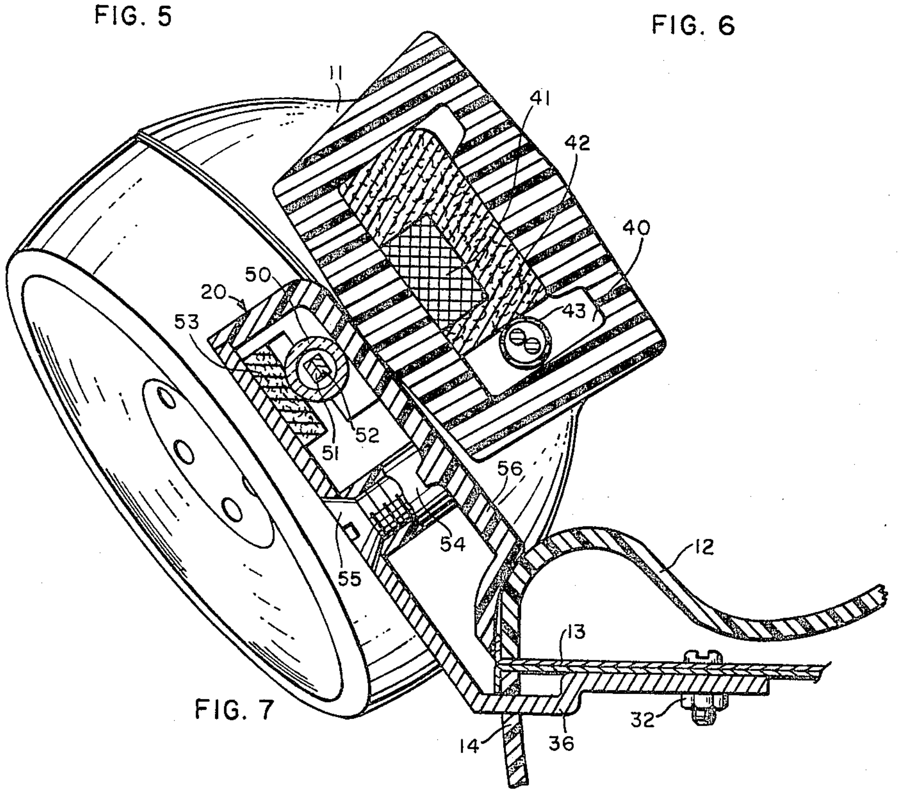
FIG. 7 is a cross-section taken along lines 7—7 of FIG. 6 showing the mode transfer hookswitch and the handset in place thereon, as well as a portion of the subset base.
Figure 8:
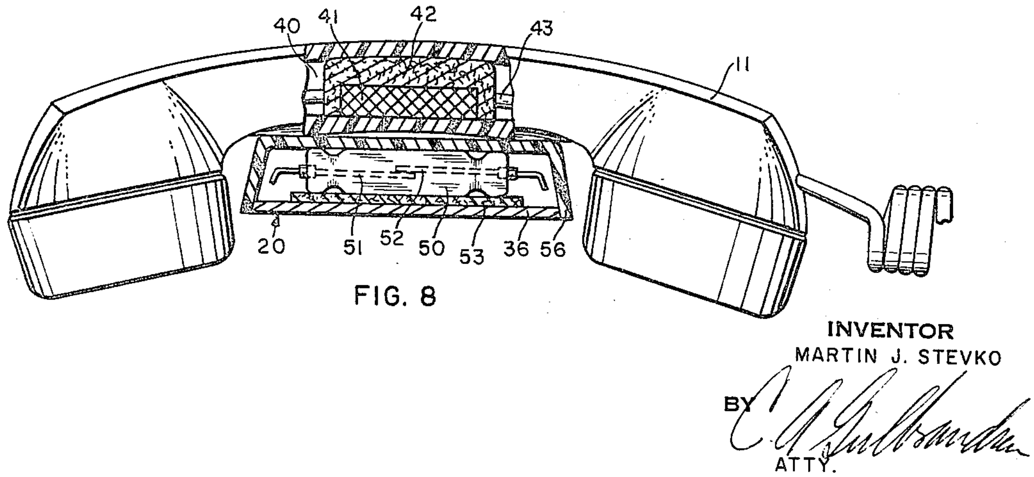
FIG. 8 is a partially sectioned view of the handset and mode transfer hookswitch as viewed from above when the handset is in place on the mode transfer hookswitch.

When the handset is placed upon the mode transfer hookswitch to effect transfer of the subset from the voice to data mode the appearance and location of the handset is as shown in FIG. 6. This positioning of the handset provides a ready visual indication to the operator or others that the subset is being employed for data transmission. Referring again to FIG. 7, the handset contains in the center portion thereof a permanent magnet 41 securely held in place by magnet holder 42. Referring now to FIG. 7 and FIG. 8, when the handset is placed upon the mode transfer hookswitch the attraction of permanent magnet 41 to the contacts of the switching means 50 will cause a closure thereof for completing the necessary circuitry to switch the subset from the voice to data modes. The two-conductor cable 43 extends from the receiver portion of the handset through the cavity 40 to the transmitter portion where it is joined to the handset cord in the well known manner.

The special purpose subset is thus seen to be constructed of three basic parts, the upper and lower shells and the center mounting plate. Located on the center mounting plate is the special mode transfer hookswitch which is designed to support in cooperation with the shell structure of the subset, the subset handset in a position that can actuate switching means to transfer the mode of operation of the subset and provide a ready visual indication of that transfer of mode of operation.

While I have described the above principles of my invention in connection with specific embodiment, it is to be clearly understood that this description is made only by way of example and not as a limitation to the scope and spirit of my invention as hereinafter claimed.

What is claimed is:

1. A telephone subset comprising in combination: a handset including a magnet mounted therein; a hookswitch having actuating bars; an upper housing shell; a lower housing shell; a component mounting center plate to which said upper and lower shells are fastened; said upper shell having a rear recessed portion with two wells for receiving the two ends of said handset, the bottom surface of said well having apertures formed therein, said lower shell serving as a base for said subset, The lower surface of said center plate mounting said hookswitch, said actuating means extending through said apertures in said recessed portion of the said upper shell; the improvement comprising a second hookswitch comprising magentically actuable switching means mounted to said center plate adjacent to said upper shell, operated in response to placement of said handset upon said second hookswitch.

2. A telephone subset comprising in combination: a handset including a magent therein, a housing including an upper shell supporting said handset; and a lower shell having a bottom portion serving as a base for said housing, a center plate to which said upper and lower shells are fastened, a first hookswitch fastened to said center plate operated in response to the removal of said handset from said upper shell, the improvement comprising a second hookswitch comprising magnetic actuable switching means connected to said center plate adjacent to said upper shell, operated in response to the magnet in said handset when said handset is placed adjacent to said second hookswitch.

3. A telephone subset comprising in combination: a handset including a permanent magnet centrally mounted therein; a housing including an upper shell having a rear recessed portion for supporting said handset; a lower shell having a bottom portion serving as a base for said housing; a center plate to which said upper and lower shells are fastened; a first hookswitch mounted to said center plate and extending through said upper housing operated in response to the removal of said handset from support by said upper housing the improvement comprising; a second hookswitch mounted to said center plate, external and adjacent to said upper housing shell, said second hookswitch including magnetically actuable switching means, operated in response to the permanent magnet mounted within said handset, in response to the placement of said handset upon said second hookswitch means.

References Cited

UNITED STATES PATENTS

| | | |
|---|---|---|
| Re. 260,034 | 6/1966 | Nise et al. |
| 2,673,252 | 3/1954 | Henrikson. |
| 2,812,387 | 11/1957 | Safarik. |
| 3,170,359 | 2/1965 | Mourra. |

KATHLEEN H. CLAFFY, *Primary Examiner.*

D. I. STEWART, *Assistant Examiner.*